(12) United States Patent
Steinmann et al.

(10) Patent No.: US 12,077,916 B2
(45) Date of Patent: Sep. 3, 2024

(54) STAINABLE SURFACE

(71) Applicant: SWISS KRONO Tec AG, Lucerne (CH)

(72) Inventors: Pius Steinmann, Schötz (CH); Roger Braun, Willisau (CH)

(73) Assignee: SWISS KRONO TEC AG, Lucerne (CH)

( * ) Notice: Subject to any disclaimer, the term of this patent is extended or adjusted under 35 U.S.C. 154(b) by 952 days.

(21) Appl. No.: 17/042,978

(22) PCT Filed: Mar. 29, 2019

(86) PCT No.: PCT/EP2019/058048
§ 371 (c)(1),
(2) Date: Sep. 29, 2020

(87) PCT Pub. No.: WO2019/185886
PCT Pub. Date: Oct. 3, 2019

(65) Prior Publication Data
US 2021/0009841 A1 Jan. 14, 2021

(30) Foreign Application Priority Data

Mar. 29, 2018 (EP) .................................... 18165078
Mar. 29, 2018 (EP) .................................... 18165082
Nov. 23, 2018 (DE) ..................... 10 2018 129 628.2

(51) Int. Cl.
*B44C 1/10* (2006.01)
*B32B 37/12* (2006.01)
(Continued)

(52) U.S. Cl.
CPC ............. *D21H 19/84* (2013.01); *B32B 37/12* (2013.01); *B32B 38/08* (2013.01); *B32B 38/164* (2013.01);
(Continued)

(58) Field of Classification Search
CPC ........ C09D 7/61; C09D 133/06; C09D 15/00; C09D 175/04; C09D 201/00; C09D 4/00;
(Continued)

(56) References Cited

U.S. PATENT DOCUMENTS 4,386,180 A 5/1983 Lat et al.
4,409,276 A 10/1983 Martinelli et al.
(Continued)

FOREIGN PATENT DOCUMENTS

CN 1250718 A 4/2000
CN 1251334 A 4/2000
(Continued)

OTHER PUBLICATIONS

US 10,159,030 B2, 08/2018, Oldorff (withdrawn)
(Continued)

*Primary Examiner* — Vishal I Patel
(74) *Attorney, Agent, or Firm* — Bachman & LaPointe, P.C.

(57) ABSTRACT

The invention relates to a method for producing a color-changeable decorative surface. In order to provide a decorative surface that can be changed in a particularly simple manner in terms of its coloring by the end consumer and which is particularly cost-effective and resistant, it is provided that at least one layer of a coating agent, which enables the absorption of color particles, is applied.

19 Claims, 1 Drawing Sheet

(51) Int. Cl.
*B32B 38/00* (2006.01)
*B32B 38/08* (2006.01)
*B44C 5/04* (2006.01)
*C09D 4/00* (2006.01)
*D21H 19/82* (2006.01)
*D21H 19/84* (2006.01)
*D21H 27/26* (2006.01)
*B32B 37/24* (2006.01)

(52) U.S. Cl.
CPC .............. *B44C 1/10* (2013.01); *B44C 1/105* (2013.01); *B44C 5/04* (2013.01); *B44C 5/043* (2013.01); *C09D 4/00* (2013.01); *D21H 19/822* (2013.01); *D21H 27/26* (2013.01); *B32B 2037/1215* (2013.01); *B32B 2037/243* (2013.01); *B32B 2305/026* (2013.01); *B44C 5/0461* (2013.01); *B44C 5/0469* (2013.01); *B44C 5/0476* (2013.01)

(58) Field of Classification Search
CPC . C09D 5/002; C09D 7/70; C09D 7/40; C09D 7/65; B05D 2503/00; B05D 2504/00; B05D 5/08; B32B 13/08; B32B 13/12; B32B 21/02; B32B 21/06; B32B 21/08; B32B 2255/10; B32B 2255/12; B32B 2255/26; B32B 2260/028; B32B 2260/046; B32B 2307/402; B32B 2307/412; B32B 2307/546; B32B 2307/718; B32B 2307/75; B32B 2419/00; B32B 2451/00; B32B 2471/00; B32B 2607/02; B32B 29/005; B32B 3/26; B32B 7/12; B32B 1/00; B32B 13/02; B32B 2037/1215; B32B 2037/243; B32B 2250/02; B32B 2255/20; B32B 2305/026; B32B 2307/40; B32B 2307/4023; B32B 2479/00; B32B 27/10; B32B 37/12; B32B 38/08; B32B 38/164; B44C 1/10; B44C 1/105; B44C 5/04; B44C 5/043; B44C 5/0461; B44C 5/0469; B44C 5/0476; C09K 3/149; D21H 19/82; D21H 19/822; D21H 19/84; D21H 27/26; E04F 11/17; F25D 15/00; F25D 21/14; F25D 23/10; F25D 2321/141

See application file for complete search history.

(56) References Cited

U.S. PATENT DOCUMENTS

| | | |
|---|---|---|
| 5,601,876 A | 2/1997 | Oates et al. |
| 5,989,681 A | 11/1999 | Martino |
| 6,187,415 B1 | 2/2001 | Gaa |
| 6,692,799 B2 | 2/2004 | Waller, Jr. |
| 7,273,651 B1 * | 9/2007 | Wilde ............... B44D 5/00 427/325 |
| 2013/0273336 A1 | 10/2013 | Kuehnberger et al. |
| 2016/0326744 A1 | 11/2016 | Doehring et al. |

FOREIGN PATENT DOCUMENTS

| | | |
|---|---|---|
| CN | 1454140 A | 11/2003 |
| CN | 105899357 A | 8/2016 |
| CN | 106457602 A | 2/2017 |
| EP | 3040476 A1 | 7/2016 |
| GB | 1314638 A | 4/1973 |
| GB | 2116192 A | 9/1983 |
| WO | 03078761 A1 | 9/2003 |

OTHER PUBLICATIONS

Machin translation of EP 3040476 A1; Inventor: Roger Braun; Publication date: Jul. 6, 2016.*
Chinese Office Action dated Mar. 7, 2022 issued for corresponding Chinese Patent Application No. 201980022767.5.
Chinese office action for patent application No. 201980022767.5 dated Jul. 14, 2021.
International preliminary report on patentability for application No. PCT/EP2019/058048 dated Sep. 29, 2020.

* cited by examiner

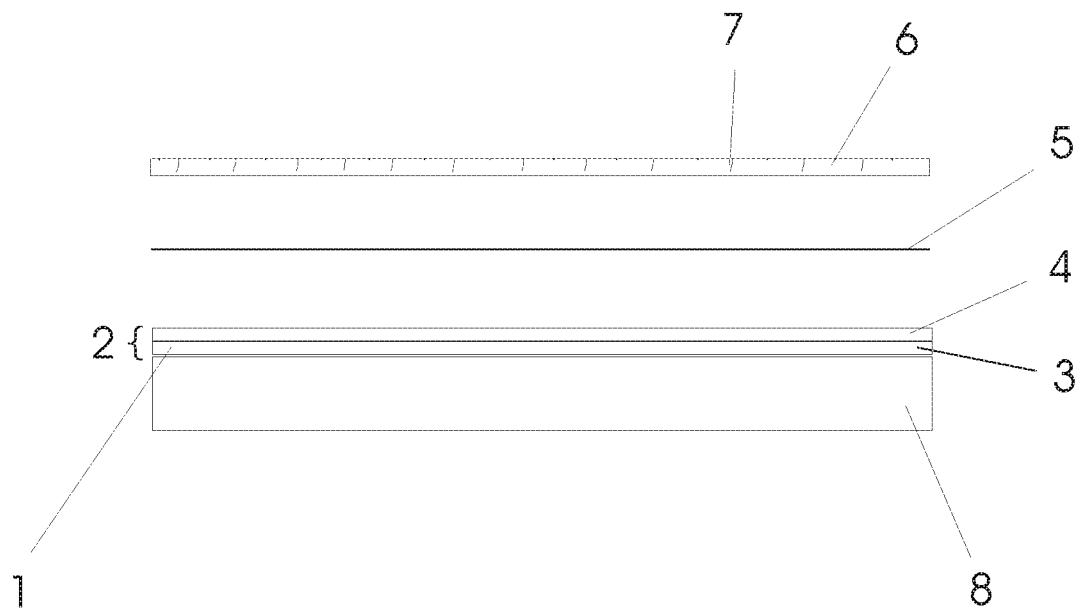

STAINABLE SURFACE

BACKGROUND OF THE INVENTION

The invention relates to a method for producing a color-changeable decorative surface, and a material with a color-changeable decorative surface.

Decorative surfaces made of synthetic resin or lacquer are generally known and are for example used for floor coverings, wall coverings, ceiling coverings or furniture. These have a decorative layer that comprises a paper with a printed decoration, or a decoration printed onto a substrate. Normally, a protective layer can be arranged on the decorative layer. It is moreover known to provide the surface with a structural decoration that for example is stamped into the surface. The layers arranged above the decoration are at least semitransparent so that the viewer can perceive the decoration.

A disadvantage is that the colored design of such surfaces can scarcely be influenced afterwards. In particular, an individual colored surface design by the end consumer as for example achieved with solid wood by staining the surfaces is no longer possible with such synthetic resin or lacquer surfaces.

Particularly in the North American region, there is however an increased need for decorative surfaces that can be colored afterward by the end consumer himself, wherein the actual decorative structures remain visible, and only the hue is to be adapted. Such surfaces that can be changed in color afterward by the end consumer could only be provided to date using solid wood surfaces such as for example with solid timber or wood veneers.

SUMMARY OF THE INVENTION

The object of the invention is therefore to provide a method for producing a decorative surface, and a material with such a decorative surface, that can be changed very easily in terms of its color by the end consumer, and that is particularly economical and durable.

The invention achieves this object by a method having the features disclosed herein and a material having the features disclosed herein. Advantageous further embodiments of the invention are set also forth herein and in the dependent claims. All of the described features constitute the subject matter of the invention both per se and in any combination, independent of their summary in the claims or their references.

The method according to the invention for producing a color-changeable decorative surface comprises the following steps: Provide a ready-to-use, fully cured decorative surface comprising a synthetic resin or lacquer on a backing layer, apply at least one layer of a coating agent, and dry and cure the coating agent layer.

With conventional cured decorative surfaces of synthetic resin or lacquer, it is no longer possible for color pigments to penetrate into the layer. Nonetheless, color pigments can be applied to the surface. The prefabricated decorative surface according to the inventive method therefore contains an additional coating with the layer consisting of coating agent that forms a new surface, whereby particularly easy subsequent adaptation of the color (hereinafter also termed staining) is enabled as is otherwise only known in the staining of solid wood surfaces. The subsequently appliable colorings (color pigments) adhere to the additional coating, or respectively accumulate in the coating, for example through a chemical bond, and color it. Although a layer of a coating agent has been applied to the decorative surface, the favorable technical properties such as of the original synthetic resin surface or lacquer surface are largely retained. Moreover a protective layer (fixing layer) such as a lacquer layer can however also be applied to the layer consisting of coating agent and the colorings consisting of the stain.

The decorative surface has a decorative print (hereinafter also decoration) that is printed onto the top side of the backing layer. Accordingly, the decoration can for example display structures of a decoration. In particular, the decoration represents for example wood grains, rock grains, rock decorations, tile decorations or fantasy decorations as well. The decoration can be configured as a colored decoration, a decoration in gray tones, or also a black/white decoration.

The decorative surface moreover comprises a transparent protective layer that for example can be designed as a transparent lacquer layer arranged above the decoration, or as a transparent synthetic resin layer, such as a transparent synthetic resin-saturated overlay. Alternatively, for example when using a permeable backing layer, the protective layer can also be formed by the cured and completely dried impregnant of the backing layer. In particular synthetic resin-based, but also of course lacquer-based impregnant is possible as the impregnant pursuant to the invention.

The decoration is visible to a user in the ready-to-use state and remains still visible even after applying the coating agent layer and the final color application (stain). Accordingly, the coating agent layer is also formed to be transparent.

It is therefore possible for example with the inventive decorative surface to darken a light overall appearance of the ready-to-use decorative surface created by an intrinsically light printed decoration, for example by means of a dark stain; i.e., the applied coloring (color pigments) produces a dark coloration of the surface, wherein the at least largely transparent layer also remains largely transparent, and the printed decorative structure is still visible.

"Color-changeable" is understood to mean that the overall colored appearance of the decorative surface provided by the decorative print on the backing layer can be individually changed subsequently by an additional application of color in the coating agent layer. The subsequent change in color can occur during industrial production or alternatively afterward, for example by a craftsman processing the product, or by the end customer. Through the application of the coating agent layer normally over the entire decorative surface, the individual performing the subsequent coloring can himself decide whether he wants to change also the color of the entire decorative surface, or only parts.

As already mentioned, the decorative structures preferably remain still visible in the change in color; only the basic hue of the decorative surface is again changed by changing the color. This enables an extreme degree of individualization, for example by the particular end consumer. The manufacturer of decorative surfaces can offer his entire previous portfolio with a significantly higher variety of color, and can even offer small series with small production volumes very easily and economically. Pre-existing structural decorations, i.e., structured surfaces (3D surfaces) are also retained since the coating agent layer is applied thin enough for it to reproduce existing surface structures. With structured surfaces, staining, i.e., the change in shade, can also produce a three-dimensional effect on the surface, for example when more stain additives collects in wood decorations in the region of structurally-formed pores (recesses in the 3D structure) such that more color pigments from the stain are in this region even after staining.

The adaptation in color of the decorative surface can be carried out with the same stains, for example a water-based stain, oil-based stain or solvent stain, as well as with the same devices as with a normal wood surface stain.

In the context of the invention, a "synthetic resin surface" is understood to be a resin system in which the complete curing of the resins that may be used for impregnation and/or coating has been carried out under the effect of heat and additionally generated pressure (greater than atmospheric pressure), for example in a short cycle press or a continuous press. Synthetic resin surfaces can for example comprise a urea resin, phenol resin, or preferably however a melamine resin.

A "lacquer surface" in the context of the invention is understood to be resin systems in which at least the outermost layer of the ready-to-use decorative surface is a lacquer surface. Lacquer surfaces are fully cured without pressure (i.e., at a maximum under atmospheric pressure), and exclusively under the effect of heat, UV radiation, electron radiation or high frequency. Lacquer surfaces can in particular be formed as acrylate lacquers or PU lacquers that for example cure under UV light.

The decorative surface can be single or multilayer. Accordingly, the decorative surface can for example be formed by a synthetic resin-impregnated decorative paper. In this case, the paper printed on the top side with a decoration forms the backing layer, and the dried and cured synthetic resin with which the paper was impregnated forms the synthetic resin surface. Alternatively, the decorative surface can for example also comprise an additional protective layer in the form of an transparent overlay arranged on the top side of the decorative paper that is also impregnated with synthetic resin and has been pressed and cured with the decorative paper. Additional layers can also be arranged such as for example layers arranged on the bottom side of the backing layer for stabilizing the backing layer, for example kraft paper layers or a material layer such as for example a material board.

Ready-to-use decorative surfaces according to the invention are for example known as HPL, CPL, DPL, etc. which are either formed as laminates for bonding to a material, in particular a board of material, or are already bonded to a material. The decorative surface formed as a synthetic resin surface has been transformed by means of heat and pressure into its ready-to-use state in which the synthetic resin is present for example as a curable plastic.

A decorative surface according to the invention can also be formed as a lacquer surface. In this case, the decoration can be printed or painted onto a backing layer. An additional, for example transparent lacquer layer that is formed as a protective layer can be applied above the decoration. Paper layers, films of plastic, or also materials, in particular board materials such as wood-based boards can also be used in this case as the backing layer. It is for example possible for the decorative surface to be formed by a wood-based board provided with a decoration in a direct printing method. So-called finish films that have a printed decoration on the top side and possibly a protective layer arranged thereupon can also be used as a ready-to-use, fully cured decorative surface. Finish films can for example be laminated onto a material board.

A material can be understood to be a backing material that can be bonded to the backing layer. Particularly preferably, a wood-plastic composite (WPC) or a wood composite, in particular a fiber material, CDF material, MDF material, HDF material, chip material, OSB material, a fiber cement board or a gypsum fiber board is used as the material. WPC is also understood to mean corresponding modifications with paper, bamboo or also rock material as the filler. Preferably, the material is a board material, in particular a WPC board, or wood-based board. These can be advantageously used for wall coverings, ceiling coverings or floor coverings. Particularly in the area of interior design for wall coverings, ceiling coverings or floor coverings, wood-based boards are used such as for example CDF boards, MDF boards, HDF boards, chipboards or OSB boards.

The decorative surface is fully cured and always ready to use independent of its formation as a synthetic resin or lacquer surface, both before applying the coating agent with stain additives as well as before performing a change in color (staining), i.e., the decorative surface does not necessarily also have to be stained after the application of the coating agent. Moreover, the decorative surface, as already mentioned, can have a corresponding surface structure, for example a stamped or painted structure.

The coating agent bonds on the one hand to the ready-to-use decorative surface; on the other hand, the coating agent is formed such that the stain bonds very easily to the coating agent, or respectively can accumulate in the coating agent layer. To improve the bond between the decorative surface and the coating agent, the decorative surface is particularly preferably pretreated. Pretreating brings about an improvement in the bonding ability of the coating agent layer to the decorative surface.

According to a further embodiment of the invention, an adhesion promoter is applied for pretreatment to the decorative surface, wherein the adhesion promoter is applied as a separate layer before applying the coating agent layer, and is gelled, dried or fully cured. The promoter forms an effective and lasting bond directly with a decorative surface, and moreover possesses the property of also being able to form a particularly lasting bond with the subsequent coating agent layer to be applied to the adhesion promoter. The adhesion promoter can be applied corresponding to the application of the coating agent layer, for example by spraying, rolling, squeegeeing, or the like.

Alternatively or in addition, the adhesion promoter is applied particularly preferably together with the coating agent as a coating agent mixture onto the decorative surface. The adhesion promoter is mixed with the coating agent. Accordingly for example with decorative surfaces that are formed as a synthetic resin surface, a particularly effective bond of the coating agent can be achieved by first applying a separate layer of an adhesion promoter to the decorative surface and then applying the coating agent with a mixed-in adhesion promoter. Particularly when forming lacquer surfaces as the decorative surfaces, it is however frequently sufficient to mix the adhesion promoter with the coating agent. Alternatively, the coating agent layer itself can also contain additives/components that lend it properties of an adhesion promoter.

According to a further embodiment of the invention, the adhesion promoter comprises a UV acrylate lacquer or a UV polyurethane lacquer (PU varnish). This concerns both an adhesion promoter to be applied as a separate layer as well as an adhesion promoter to be mixed into the coating agent. Both UV acrylate lacquer as well as UV polyurethane lacquer can be used very flexibly and form a particularly tight bond with a wide range of decorative surfaces.

Particularly preferably, for pretreatment, the decorative surface is corona-treated, roughened, etched with an acid or alkaline solution, powder-coated, plasma-treated, flame-treated and/or subjected to fluorination. The aforementioned pretreatment steps can be carried out alternative to or in addition to the pretreatment using the above-described adhesion promoter.

The coating agent can moreover comprise a stain additive and be formed as a liquid synthetic resin with an added stain additive that is applied to the surface and pressed with it in a press.

According to a further embodiment of the invention, it is however provided that a lacquer (corresponding to the aforementioned definition) with an added stain additive is applied as the coating agent. A coating agent based on a lacquer can be processed very easily, and in particular the drying and curing to be carried out after application can be done without harmful interference in the decorative surface arranged below the coating agent layer.

According to a further embodiment of the invention, kaolin, chalk, alumina, silica, mica, quartz sand, silicate, glass spheres, glass powder, silane, cellulose or natural fibers are used as the stain additive. Kaolin can for example be used as hydrated aluminum silicate. Preferably, the stain additives can be silanized. Particularly preferably, kaolin is used in a hydrated and/or calcined form, wherein a mixture, for example at a ratio of 50% by weight:50% by weight of the two forms is advantageous. Accordingly, the calcined form allows the stain colors to fix particularly well, whereas the hydrated form is more transparent and thus prevents reduced coverage of the decoration. The preferred stain additives can be used both with a coating agent formed as a lacquer as well as a coating agent formed as a synthetic resin.

Moreover, silanized kaolin is preferably used since this additionally promotes the adhesion of the stain color. This can be used as a mixture with non-silanized kaolin. Particularly preferably, the portion of silanized kaolin is between 50% by weight to 80% by weight of the overall kaolin requirement.

Kaolin and chalk also produce a suction effect with colorings applied as a liquid stain by means of which the colorings are added particularly easily to the coating agent layer, or cause a particularly effective (chemical) bond of the color particles of the stain to the coating agent layer. Moreover, kaolin and chalk fix the colorings in/on the coating agent particularly well.

To further improve the incorporation of the coloring in the coating agent layer, or respectively the bond of the stain to the coating agent layer, and therefore also make it very easy to stain the surface, the percent weight of the stain additive in the coating agent before the coating is applied is 10% by weight to 60% by weight, preferably 10% by weight to 50% by weight, particularly preferably 20% by weight to 50% by weight, preferably 30% by weight to 50% by weight according to a further embodiment of the invention. The preferred weight ratios of the coating yet to be applied ensure a particularly effective and even open-pore formation of the surface so that the absorption of the color pigments into the synthetic resin surface/lacquer surface, or respectively their fixation in the respective surface can be very even and effective.

A stain additive is understood to be an additive present in the coating agent and causes the formation of a porous surface (open-pore) of the coating agent layer applied and dried, or respectively cured as a layer. Moreover, the stain additive can improve the bonding ability of the coating agent to the decorative surface formed as a synthetic resin or a lacquer surface, or respectively the bonding ability of the stain to the coating agent.

"Open pore" is understood to mean that the cured layer of the coating agent is formed to absorb colorings (color pigments) within the layer. This can be achieved using the stain additive. The cured coating can be semitransparent to fully transparent so that a decoration printed on the backing layer is perceptible largely undistorted. It is possible for the cured coating to already place a first basic hue over the decoration that is again modified later by the color application.

According to a further embodiment of the invention, the coating agent comprises a lacquer based on an aminoplast, in particular a urea resin such as UF or MUF, acrylate, polyester, PUR, nitrocellulose and/or phenol resin, or a mixture of at least two of the aforementioned substances. In particular, acrylate resins have proven to be particularly suitable in forming the coating agent layer without a stain additive, wherein they can also be used with a stain additive. In addition, for example, a lacquer based on acrylic, alkyd and/or latex can be used. The lacquers may in particular be formed as dispersions. It is for example also possible to use an adhesion promoter based on UV lacquer, for example, with a stain additive as the coating agent with a stain additive.

Preferably a lacquer/kaolin mixture is used as the coating agent with a stain additive to produce a lacquer surface. In this case, a lacquer based on acrylate or PUR with a stain additive based on kaolin is used in particular, since a very even distribution of the stain additives in the coating agent and a very good bond of the stain to be subsequently applied in, or respectively on the layer of coating agent is enabled with this combination. Moreover, the UV acrylate lacquers, or respectively UV PU lacquers that are particularly suitable as adhesion promoters are also combinable in a particularly advantageous manner with corresponding coating agents that are fabricated based on acrylate or PU. Preferably, both the lacquer of the coating agent as well as the adhesion promoter originate based on the same group of substances.

According to a further embodiment of the invention, the coating agent is applied to the top side of the backing layer, i.e., to the ready-to-use decorative surface, using an application roller, a squeegee or a spray device. This allows the layer thickness to be adjusted very easily and thin so that the favorable technical properties of the decorative surface remain largely retained. The application is performed for example by using a rubber roller, in particular with a sponge rubber roller having a hardness of 30-40 Shore A (normally 60-80 Shore A).

Particularly preferably, the coating agent is formed on the basis of water, i.e., it is applied as an aqueous solution. According to a development of the invention, the coating agent is dried after application during which the solvent, in particular water, evaporates. Drying can for example be carried out using heat, in particular within temperature ranges of 40° C.+/−5° C., and with circulating air. Finally, the layer of coating agent is at least partially cured, i.e., gelled; however it can also alternatively be already fully cured. Curing is preferably done using UV light and increases the resistance of the coating agent layer to mechanical or chemical stress. Preferably a gallium lamp with for example 80 W can be used for UV curing.

Subsequent coloring occurs after complete drying (for example by heat and circulating air) and curing (for example using UV light) of the coating agent layer, and can in particular be done using conventional wood stains, in particular conventional water-based stains, oil-based stains or solvent-based stains for wood surfaces. In so doing, the basic color of the decorative surface provided by the decoration is individually modified afterwards, i.e., after the actual industrial production of the synthetic resin surface/lacquer surface. For a particularly effective bond to the layer of coating agent, the stain also comprises a slight amount of bonding agent (polymer).

The color-changeable decorative surface is significantly more economical and resistant to external influences than stainable solid wood surfaces.

Independent of its formation as a synthetic resin surface or lacquer surfaces, and also independent of the employed type of material for the layer of coating agent, or respectively independent of a stain additive that may be used, another in particular thin protective layer can be applied to the surface after applying and possibly drying the stain to also protect the color particles from the stain from external influences. For the protective layer (fixing layer), a varnish, in particular corresponding to the aforementioned materials, can be used for the coating agent layer. It is also for example possible to apply the protective layer as an oil or wax, wherein this use is employed in particular for floor panels.

The object is also achieved by a material having a ready-to-use, fully cured decorative surface with a layer of a coating agent applied to the top side of the decorative surface that is formed to absorb and bond color particles.

The color particles are usually applied using a colored stain, i.e., for example a water-based stain, oil-based stain or solvent-based stain. In addition to industrial processing, the inventive material board also enables processing by the craftsman or the end customer working the material, i.e., a nonindustrial modification of the coloration of the synthetic resin surfaces as well.

A material comprises for example a backing layer onto which a decoration is printed and that has one or more layers of paper such as decorative paper and/or kraft paper. The material can also be understood to be a support material onto which a decoration is printed in a direct printing. The material can in particular be formed as a board material. The material can consist of a different material and for example be a wood composite. Particularly suitable are chip materials, fiber materials such as MDF, HDF or CDF materials, OSB materials, cement fiber materials, gypsum fiber materials or WPC materials that are particularly suitable in being formed as board materials.

It should be noted that the subsequent enduring colorability of the ready-to-use, fully cured decorative surface is brought about by the applied coating agent layer independent of its formation as a synthetic resin surface or lacquer surface. The ready-to-use fully cured decorative surface does not have any stain additives before the application of the coating agent layer.

Another possible use for the layer of coating agent with stain additives consists for example of creating a visual emphasis of the pore for furniture decorations, but also for panels for walls, ceilings or floors with synchronous pore, and independent of whether the layer is formed as a lacquer surface or synthetic resin surface. The pores are generally formed as a recess; i.e., after the application of the coating agent, a greater amount of coating agent can collect in the region of the recess which can also absorb/bond more color particles from the stain so that the coloration of the pores changes more strongly in comparison to the other sections of the decorative surface. This can moreover be emphasized, or respectively alternatively produced in that the coating agent is partially removed directly after application so that the coating agent with stain additive primarily remains only in the region of the pores (recesses).

Although some aspects were described in conjunction with a method, it is understood that these aspects also represent a description of the corresponding device so that a corresponding method step is to be understood as a block element or a component of a device. Analogously, aspects that were described in conjunction with a block element or a component of a device also represent a description of a corresponding method step Hereinafter the invention will be further explained below with reference to exemplary embodiments.

BRIEF DESCRIPTION OF THE DRAWINGS

It is shown in:

FIG. 1 schematically a color-changeable decorative surface produced according to the inventive method;

Ex. 1 describes the production of a decorative surface that can be adapted in color and produced by direct printing.

Ex. 2 describes a first method for producing a color-changeable decorative surface using a roller application device;

Ex. 3 describes a second method for producing a color-changeable decorative surface using a roller application device;

Ex. 4 describes a method for producing a color-changeable decorative surface using a spray device;

Ex. 5 describes another method for producing a color-changeable decorative surface;

Ex. 6 describes a further method for producing a color-changeable decorative surface.

DETAILED DESCRIPTION

FIG. 1 shows a side view of a backing layer 1 with a ready-to-use decorative surface 2. The backing layer 1 in this case is formed as a decorative paper 3 impregnated with synthetic resin with a decorative print. Arranged above the decorative paper is an overlay 4 which is part of the decorative surface 2. The decoration in this case shows a wood grain, but it can alternatively however also show a tile decoration, rock decoration or fantasy decoration, for example. The overlay 4 comprises a synthetic resin-saturated overlay paper that, in a cured state, is fully transparent so that the decoration is still visible.

A material board 8 is formed below the backing layer 1. The material board 8 consists of a wood composite, in this case a chipboard. Alternatively, materials consisting of other materials or other wood composite boards such as the MDF boards, HDF boards, etc. can also be used. The backing layer is securely adhered to the material board.

Moreover, additional intermediate layers can be arranged between the material board 8 and the decorative paper 3. For example another paper layer (not shown here) such as kraft paper can also be arranged instead of a wood composite board.

Just like the overlay 4, the decorative paper 3 has also been impregnated with synthetic resin. In this case, a melamine was used for both layers. The synthetic resin surface 2 was adhered to the material board in a short cycle process (not shown here) under the effect of pressure and heat, and in so doing was fully cured. In this case, a structural decoration (not shown here) was stamped into the surface of the overlay 4.

In order to subsequently modify the color of the synthetic resin surface 2, i.e., render it stainable, the synthetic resin surface was pretreated. To accomplish this, a liquid adhesion promoter 5 was applied in this case to the structured synthetic resin surface 2. This is done using a spray device (not shown here), alternatively for example using a roller device. The adhesion promoter 5 was then gelled.

Subsequently, a layer 6 of a coating agent was applied to the adhesion promoter 5. The coating agent is formed as a UV lacquer based on acrylate. In this case, it contains a stain additive 7 that however is optional. It was applied using a roller arrangement (not shown here) onto the adhesion promoter 5. After applying the layer 6, it and the adhesion promoter 5, also based on a UV lacquer, were fully cured using UV light.

Alternatively or in addition, it is also possible to apply the adhesion promoter 5 together with the coating agent as a mixture onto the decorative surface 2. Alternatively or in addition, a "mechanical" pretreatment of the decorative surface 2 could also have been done. This would be possible for example through a corona pretreatment, fluorination, through grinding, through etching, or through a plasma or flame treatment. Of course, the coating agent application would also be possible without adhesion promoter, or respectively pretreatment.

In addition to the improved bonding ability to the decorative surface, or respectively of the stain to the coating agent, the existing stain additives 7 form the layer 6 as a porous surface (not shown here), i.e., the stain additives 7 are present in the layer 6 distributed very evenly. Kaolin (not shown here) is mixed in the coating agent as the stain additive 7. The percent weight ratio between the liquid coating agent and kaolin was 1:1 before application.

To subsequently change the color of the synthetic resin surface 2, a stain, for example solvent-based, water-based or oil-based is applied to the layer 6. The colorings in the stain are absorbed by the coating agent layer, or respectively bond chemically thereto. Moreover, the color particles from the stain penetrate into the coating agent layer due to the porosity. The solvents evaporate. This changes the overall colored appearance of the synthetic resin surface 2. Finally, a fixing layer can be applied.

In the aforementioned example, a ready-to-use lacquer surface can also be alternatively used instead of the synthetic resin surface. This can include for example printed paint pores that represent a structural decoration.

Example 1

In a further exemplary embodiment, a decorative surface produced in direct printing is provided. The decorative surface is fully cured and ready to use. To produce the decorative surface, a wood composite board, in this case an MDF board, was prepared by grinding and priming processes for direct printing. The color decoration is printed directly on the primer layer(s), in this case by roller printing. Alternatively, the color decoration could also be printed by digital printing. Finally, the color decoration was provided with a protective layer that consists of several thin layers of a clear varnish. The clear lacquer is based on a UV acrylate lacquer.

Moreover, a structuring of the surface was created over the protective layer. All the layers of the decorative surface were fully cured. This was done in this case using UV light.

Then a coating agent is applied to the ready-to-use decorative surface produced in this manner. Application is accomplished using an application roller. In this case as well, the coating agent includes an optional stain additive so that the coating agent is for example a lacquer/kaolin mixture that was mixed at a weight ratio of 1:1. Optionally, the decorative surface can be pretreated using a corona treatment for particularly effective adhesion of the coating agent on the decorative surface. A UV acrylate lacquer was used for the lacquer of the coating agent. Then the coating agent was applied using a spray device, alternatively a roller device, to the pretreated decorative surface, dried and then fully cured using UV light. The wood composite board with the directly printed decorative surface and the layer of coating agent arranged on the surface can now be stained; i.e., a stain containing color particles can be applied to the surface both industrially as well as by the end customer. This can for example be done using a cylinder, a brush, a roller or a cloth as well. In so doing, the color particles are bond to the coating agent, or respectively penetrate into the porous surface of the coating agent formed by the kaolin and are fixed there. After removing the excess stain and drying the stain, there is a change in color to the decorative surface, wherein the decoration is still visible. To protect the stained coating agent layer, another protective layer (fixing layer) such as a lacquer layer can also be finally applied.

Another initial product for producing a subsequently changeable decorative surface can for example be finish films. These have for example a backing layer consisting of paper or plastic. A decoration is printed on this backing layer, and a protective layer is arranged above the decoration. The decoration and the protective layer are completely dried, or respectively cured.

Normally, a finish film is adhered/laminated using a lamination system and for example with a hot melt adhesive to a material such as a wood composite board. The decorative surface of the finish film can also be subjected to a pretreatment corresponding to the above-described examples before or after lamination, so that a layer of the coating agent with stain additives is then applied, dried, or respectively fully cured so that the finish film has a subsequently color-changeable decorative surface.

Example 2

Starting with a ready-to-use decorative surface with a color decoration and a structural decoration based on lacquer or based on synthetic resin, a coating agent is rolled onto the ready-to-use decorative surface using a roller application device. The coating agent is formed as an aqueous solution. The coating agent forms in particular an at least largely transparent layer so that the color decoration remains visible even through the coating agent layer. As the coating agent, for example a Hydro Special stain FT by the company Hesse or a Hydro UV stain FT also by the company Hesse can be used. When applying, between approximately 8 $g/m^2$ and 14 $g/m^2$ is rolled onto the decorative surface. Then the layer of coating agent is dried during which the water evaporates. Drying is done at approximately 40° C. and over approximately 20 sec. Drying can for example be performed by drying with circulating air.

In order to increase the strength, such as for example the scratch resistance of the layer consisting of coating agent, the dried coating agent layer is at least partially cured using UV light, i.e., at least initially cross-linked (gelled). This allows the backing layers with the decorative surfaces and the coating agent layer to be easily stackable and transported without them sticking together. The at least partial curing is done in particular using a UV lamp based on gallium.

Rolling is done with a rubber roller, in particular a sponge rubber roller. The rubber roller has for example a hardness between 30-40 Shore A.

Example 3

In contrast to producing the ready-to-use decorative surface from example 2, the production method from example 3 only differs in terms of the coating agent used. In this second possible embodiment of the method, a UV primer by the company Hesse is used as the coating agent, in particular UG 7541-FT. This is applied at an amount between 10 g/m² to 15 g/m².

Example 4

In this case as well, starting from a ready-to-use decorative surface with a color decoration and a structural decoration based on lacquer or based on artificial synthetic resin, a coating agent is applied. The application is carried out using a spray device. For example Hydro special stain or the solvent-based stain FT by the company Hesse is used as the coating agent. The coating agent is applied at an amount between 15 g/m² to 30 g/m². This is followed by drying over approximately 3 min. to 4 min. Drying can be performed by drying with circulating air. This is preferably done at temperatures of 30° C. to 40° C.

Finally, the coating agent is at least partially cross-linked (gelled) or fully cured with UV light corresponding to examples 2 and 3.

The decorative surfaces from examples 2 to 4 are prepared for applying a stain after curing, or respectively partial curing (gelling, partial cross-linking). All commercially available colored stains that for example are provided for wood or wood-containing materials are suitable as the stain. Accordingly for example water-based stains, oil-based stains or stains with other solvents can be used. Moreover, preferably colored stains are used that at least contain a slight amount of a binder (polymer) for improving the bond to the coating agent layer.

After applying and drying and possibly curing the stain with the associated change in color of the decorative surface, a fixation layer that moreover functions as a protective layer can be applied. The fixation layer prevents the stain layer from being removed from the coating agent layer under stress (mechanical, chemical).

The fixation layer can also be applied by means of roller application or a spray device. In a particularly preferred embodiment of roller application that in particular can be done industrially, first a layer of Hesse UV topcoat, such as UU 7333 at an amount of approximately 3 g/m² to 5 g/m² is applied and gelled with UV light, for example with a mercury-based UV lamp at 80 W. Then a second layer of the same topcoat is applied using the same application amount. Both layers are then cured using the aforementioned UV lamp, wherein to do this, for example 2-3 curing passes can also be carried out.

To apply the fixation layer by a spray device, in particular the following lacquers by the company Hesse are suitable:
1. UV topcoat, such as UU 7333 at an application amount of 3 g/m² to 5 g/m² in two layers corresponding to the above-described roller application;
2. Hydro UV single coat paint HUE 8656 with an application amount of 100 g/m² to 120 g/m²,
3. Hydro top seal HE 65 09 with a single-layer application and an application amount of 100 g/m² to 120 g/m².
4. PUR multicoat lacquer DE 4503 with an application amount of 100 g/m² to 120 g/m².

The lacquers are dried and/or cured corresponding to their specifications, or respectively for example gelled between the individual application passes in the event of multilayer application.

An alternate color change can for example be carried out using a lacquer layer instead of a stain. In this case, a lacquer layer, in particular a colored lacquer, is applied to the at least partially cured coating agent layer and dried and/or cured, for example using UV light.

The coating agent layer functions inter alia as an adhesion promoter, both when applying the stain as well as when applying the lacquer. Consequently, the coating agent is formed to adhere to the ready-to-use decorative surface of synthetic resin or lacquer, or respectively to form a bond with the decorative surface. On the other hand, the coating agent layer enables the stain, or respectively the lacquer application to adhere to it, or respectively the option of forming a bond with its surface.

Example 5

In a lacquer application alternative to the stain application on the coating agent layer, the coating agent layer also prevents the lacquer from sagging so that a structured colored surface can be produced when there is a structured surface that already has a slight amount of colored lacquer. This renders the lacquer application on the coating agent layer particularly suitable to produce for example surfaces such as white ash, etc. in which the pore structure of the surface remains largely retained but corresponds in color to the lacquer color. The surfaces obtained thereby are very similar to color painted real wood surfaces with pore structures, and are visually and haptically superior to the known surfaces produced for example using of film. Lacquering the coating agent layer can in particular be used for interior construction surfaces such as for example door surfaces.

Example 6

Another exemplary embodiment for producing a color-changeable decorative surface provides applying at least one layer of a coating agent onto a ready-to-use decorative layer consisting of lacquer or synthetic resin. When using a coating agent without a stain additive, for example a multicoat lacquer based on acrylic resins that can be used as a primer, for example the coating agent Hydro-UV multicoat lacquer HUE 8656X by the company Hesse-Lignal can be used.

The coating agent is applied at an amount between 10 g/m² to 30 g/m². Application is done in particular by a roller application using a rubber roller. The rubber roller preferably has a Shore A hardness of 40 (Shore A 40).

Then the coating agent layer is dried and cured, preferably at temperatures between 60° C. and 180°. The drying time is between 10-20 sec.

The aforementioned coating agent without a stain additive also forms a ready-to use stainable surface after drying and curing that has sufficient porosity for subsequently applied color particles to be able to accumulate in and on the outer coating agent layer. Curing is done in particular with UV light, for example a mercury UV lamp with 100-400 MJ/m². For very even curing, preferably 5 mercury UV lamps of 120 W each are used.

To subsequently modify the color of this decorative surface, for example conventional stains based on water or other solvents can be used. Accordingly for example, the stain "Parquet-Colour" by the company Hesse-Lignal can be used. The stained and dried surface can moreover be subsequently resealed with a corresponding protective layer. For this, a multicoat lacquer based on a two-component PUR acrylic resin lacquer is useful. Accordingly for example the coating agent PUR SUN-CAPE DE 4800X by the company Hesse-Lignal can be used.

When the coating agent layer is applied onto a decorative surface that is subsequently bonded to a material such as for example when applied to a laminate (HDL, CPL, etc.), the stainable decorative surface can be laminated onto the material. This is preferably done using a PUR hot melt adhesive at 130° C.+/−10° in a calender with a linear pressure between 50 N/m and 80 N/m. The preferred parameters ensure that the laminated decorative surface can also be stained even after lamination.

The invention claimed is:

1. A method for producing a color-changeable decorative surface (2) comprising the steps:
    provide a ready-to-use, fully cured decorative surface (2) comprising a synthetic resin on a backing layer (1), said resin being cured under the effect of heat and pressure higher than atmospheric pressure,
    apply at least one layer (6) of a coating agent, the coating agent being a lacquer with a stain additive that allows color particles to be absorbed, the at least one layer (6) of the coating agent being transparent,
    dry and cure the coating agent layer (6).

2. The method according to claim 1, wherein the ready-to-use decorative surface (2) is pretreated before applying the at least one layer of the coating agent.

3. The method according to claim 2, wherein an adhesion promoter is applied for pretreatment to the decorative surface (2), wherein the adhesion promoter is applied as a separate layer before applying the coating agent layer (6), and is gelled, dried or is fully cured.

4. The method according to claim 3, wherein the adhesion promoter is applied together with the coating agent as a coating agent mixture onto the decorative surface (2).

5. The method according to claim 3, wherein the adhesion promoter comprises a UV acrylate lacquer or a UV polyurethane lacquer (PU varnish).

6. The method according to claim 1, wherein for alternative or additional pretreatment, the decorative surface (2) is corona-treated, roughened, etched with an acid or alkaline solution, powder-coated, plasma-treated, flame-treated and/or subjected to fluorination.

7. The method according to claim 1, wherein kaolin, chalk, alumina, silica, mica, quartz sand, silicate, silanized materials, glass spheres, glass powder, cellulose or natural fibers are used as the stain additive (7).

8. The method according to claim 1, wherein kaolin is used in a hydrated and/or calcined form as the stain additive (7).

9. The method according to claim 1, wherein the percent weight of the stain additive (7) in the coating agent is 10% by weight to 60% by weight.

10. The method according to claim 1, wherein the coating agent comprises a lacquer based on an aminoplast.

11. The method according to claim 1, wherein a water-based coating agent is used.

12. The method according to claim 1, wherein the coating agent is dried by circulated air drying.

13. The method according to claim 1, wherein the coating agent is at least partially cured.

14. The method according to claim 1, wherein the coating agent is applied to the top side of the backing layer (1) using an application roller, a squeegee or a spray device.

15. The method according to claim 9, wherein the percent weight of the stain additive (7) in the coating agent is 20% by weight to 50% by weight.

16. The method according to claim 9, wherein the percent weight of the stain additive (7) in the coating agent is 30% by weight to 50% by weight.

17. The method according to claim 13, wherein the coating agent is fully cured after drying.

18. The method according to claim 1, wherein the coating agent is at least partially cured using UV light.

19. The method according to claim 10, wherein the lacquer is based on a urea resin of acrylate, PUR, phenol resin, nitrocellulose, or is based on a mixture of at least two of the aforementioned lacquers.

* * * * *